US010837584B2

(12) United States Patent
Bradberry (10) Patent No.: US 10,837,584 B2
(45) Date of Patent: Nov. 17, 2020

(54) RESTRAINT DEVICE (71) Applicant: THE FORD METER BOX COMPANY, INC., Wabash, IN (US)

(72) Inventor: Earl Sinjon Bradberry, Vestavia Hills, AL (US)

(73) Assignee: The Ford Meter Box Company, Wabash, IN (US)

(*) Notice: Subject to any disclaimer, the term of this patent is extended or adjusted under 35 U.S.C. 154(b) by 465 days.

(21) Appl. No.: 15/867,916

(22) Filed: Jan. 11, 2018

(65) Prior Publication Data
US 2018/0195652 A1 Jul. 12, 2018

Related U.S. Application Data (60) Provisional application No. 62/445,405, filed on Jan. 12, 2017.

(51) Int. Cl.
*F16L 25/04* (2006.01)
*F16L 21/08* (2006.01)

(52) U.S. Cl.
CPC .............. *F16L 25/04* (2013.01); *F16L 21/08* (2013.01)

(58) Field of Classification Search
CPC .................................. F16L 25/04; F16L 21/08
USPC ..................................................... 285/81, 420
See application file for complete search history.

(56) References Cited

U.S. PATENT DOCUMENTS

| | | | | |
|---|---|---|---|---|
| 1,098,299 A | * | 5/1914 | Powell ..................... | F16L 21/08 285/337 |
| 1,322,347 A | * | 11/1919 | Robertson .............. | F16L 21/08 285/337 |
| 4,635,970 A | * | 1/1987 | Haines ..................... | F16L 21/08 285/114 |
| 5,934,334 A | * | 8/1999 | Gray, Jr. ................... | F16L 7/00 138/108 |
| 6,095,197 A | * | 8/2000 | Kane ........................ | F16L 21/08 138/110 |
| 6,322,273 B1 | | 11/2001 | Gentile, Jr. | |
| 8,267,438 B2 | * | 9/2012 | Radzik ................... | F16L 23/032 277/626 |

OTHER PUBLICATIONS

Uni-Flange Series 1390 Pipe Restraint.
Uni-Flange Pipe Restraints for AWWA C909 PVC Pipe—Series 1309 and 1399 Restraint Device.
The Ford Meter Box Co., Inc.; The Ford Meter Setter; Jun. 6, 2017; C909/C907 Restraint Solutions; www.fordmeterbox.com.
Statement of Admitted Prior Art—Signed by Earl Sinjon Bradberry May 18, 2018.

* cited by examiner

*Primary Examiner* — Matthew Troutman
*Assistant Examiner* — Fannie C Kee
(74) *Attorney, Agent, or Firm* — Barnes & Thornburg LLP (57) ABSTRACT

A restraint device assembly that couples adjoining pipes together is provided. The restraint device assembly includes a ring portion having an arcuate inner periphery surface that encircles an outer wall surface of a pipe. The ring includes a first tie rod opening located adjacent a first location and a second tie rod opening located adjacent a second location. The first and second tie rod openings are spaced apart from each other by a first distance. The second ring portion includes a third tie rod opening located adjacent the first location, a fourth tie rod opening located adjacent the second location. The fourth tie rod opening is spaced apart from the third tie rod opening a second distance.

17 Claims, 6 Drawing Sheets

RESTRAINT DEVICE

RELATED APPLICATIONS

The present application relates to and claims priority to U.S. Provisional Patent Application Ser. No. 62/445,405, filed on Jan. 12, 2017. The subject matter disclosed in that provisional application is hereby expressly incorporated into the present application in its entirety.

TECHNICAL FIELD AND SUMMARY

The present disclosure relates to joint restraint assemblies, and particularly to a clamp-on restraint suitable for molecularly oriented polyvinyl chloride and similar-type pipe.

Joint restraint assemblies for connecting polyvinyl chloride (PVC) pipes together, such as C900/C905 pipes, are known in the water works industry. Such joint restraint assemblies typically comprise an annular body or gland that fits about and secures onto the outer periphery or surface of a pipe. This gland includes tie rod holes or bolt holes oriented parallel to the pipe. When the glands are affixed to connecting pipes, bolts or tie rods may be inserted through the bolt hole openings of each gland, run parallel to the pipe, and fasten to the glands, thereby securing the two pipes together. Typically, these bolt openings are evenly spaced about each gland to distribute the coupling forces. An example of a joint restraint assembly is shown in U.S. Pat. No. 6,322,273 ('273 patent), titled "Joint Restraint Assembly," the disclosure of which is incorporated herein in its entirety by reference. As shown in FIGS. 1 and 2 of the '273 patent, the joint restraint assembly includes a gland having six-segments spaced evenly about the pipe joint opening to grip the pipe.

Since development of the six-segment joint restraint assembly, alternate joint restraint assemblies comprising a gland having 2 or 3 spaced apart segments were developed. These segments were also evenly distributed about the circumference of the gland distributing the securing force and stress on the pipe. Two and three-segment glands work well and are cost effective alternatives to the more expensive six-segment gland. A common characteristic of these glands, however, is that there is not the same gripping coverage of the six-segment gland. Between each of the consecutive segments is a space that is also bounded by the outer periphery of the pipe. For many pipe-types, these spaces do not pose an issue.

In certain other instances, however, these spaces may create issues when using certain types of pipes, particularly AWWA C909 PVC pipes. The C909 pipe is made from molecularly-oriented PVC (PVCO) which is more flexible, has thinner walls, and is a harder shell pipe compared to C900 material. This makes the particular pipe more difficult to grip than the standard PVC C900/C905 pipe. Because of these characteristics, when securing a gland onto the outer periphery of the C909 pipe, the segments may tend to deform the pipe's body which might result in bulges foil ling between the segments. The effect of this is a weaker joint that could fail under certain circumstances.

Accordingly, an illustrative embodiment of the present disclosure provides a restraint device assembly that couples adjoining pipes together. The restraint device assembly comprises a pair of ring portions composed of a first ring portion and a second ring portion; wherein the first and second ring portions each include an arcuate inner periphery; wherein positioned together arcuate inner peripheries of the pair of ring portions encircle an outer wall surface of a pipe and engage a circumference of the outer wall surface of the pipe; wherein the arcuate inner periphery of the first ring portion does not have any substantial gaps that allow the pipe to deform and occupy; wherein the arcuate inner periphery of the second ring portion does not have any substantial gaps that allow the pipe to deform and occupy; a first fastener that engages both the first and second ring portions at a first location to selectively secure the first and second ring portions together at the first location; a second fastener that engages both the first and second ring portions at a second location to selectively secure the first and second ring portions together at the second location; wherein the first and second locations are positioned axially opposed to each other on an axis oriented transverse to a longitudinal extent of the pipe; wherein the first and second ring portions each includes a flange extending radially from each of the arcuate inner peripheries of each of the first and second ring portions; wherein the first ring portion includes a first tie rod opening located on the flange adjacent the first location; wherein the first ring portion includes a second tie rod opening located on the flange adjacent the second location and spaced apart from the first tie rod opening by a first distance; wherein no tie rod openings are located on the flange of the first ring portion between the first and second tie rod openings; wherein a first portion of a third tie rod opening is located on the first ring portion adjacent the first location and adjacent the second ring portion; wherein the first portion of the third tie rod opening is spaced apart from the first tie rod opening a second distance; wherein the second distance between the first portion of the third tie rod opening and the first tie rod opening does not have the same length as the first distance between the first and second tie rod openings; wherein a first portion of a fourth tie rod opening is located on the first ring portion adjacent the second location and adjacent the second ring portion; wherein the third distance between the first portion of the fourth tie rod opening and the second tie rod opening does not have the same length as the first distance between the first and second tie rod openings; wherein the second ring portion includes a fifth tie rod opening located on the flange of the second ring portion adjacent the first location; wherein the second ring portion includes a sixth tie rod opening located on the flange of the second ring portion adjacent the second location and spaced apart from the fifth tie rod opening a fourth distance; wherein no tie rod openings are located on the flange of the second ring portion between the fifth and sixth tie rod openings; wherein a second portion of a third tie rod opening is located on the second ring portion adjacent the first location and adjacent the first ring portion; wherein a fifth distance between the second portion of the third tie rod opening and the fifth tie rod opening does not have the same length as the fourth distance between the fifth and sixth tie rod openings; wherein a second portion of a fourth tie rod opening is located on the second ring portion adjacent the second location and adjacent the first ring portion; wherein a sixth distance between the second portion of the fourth tie rod opening and the sixth tie rod opening does not have the same length as the fourth distance between the fifth and sixth tie rod openings; wherein the first and second portions of the third tie rod opening form the third tie rod opening when the first fastener engages both the first and second ring portions at the first location and secures the first and second ring portions together; and wherein the first and second portions of the fourth tie rod opening form the fourth tie rod opening when the second fastener engages both the first and second ring portions at the second location and secures the first and second ring portions together.

In the above and other illustrative embodiments, the restraint device may further comprise: the first fastener engaging both the first and second ring portions at the first location and adjacent the first, third, and fifth tie rod openings to prevent a pivot point at the first location to prevent excessive loading on the pipe, and wherein the second fastener engages both the first and second ring portions at the second location and adjacent the second, fourth, and sixth tie rod openings to prevent a pivot point at the second location to prevent excessive loading on the pipe; the first ring portion including a second flange extending radially from the arcuate inner periphery of the first ring portion, spaced apart from and parallel to the flange extending radially from the arcuate inner periphery of the first ring portion, and wherein the second ring portion includes a second flange extending radially from the arcuate inner periphery of the second ring portion, spaced apart from and parallel to the flange extending radially from the arcuate inner periphery of the ring portion; the first ring portion includes a first channel block located between the flange and the second flange at the first tie rod opening, and a second channel block located between the flange and the second flange at the second tie rod opening, and the second ring portion includes a third channel block located between the flange and the second flange at the fifth tie rod opening, and a fourth channel block located between the flange and the second flange at the sixth tie rod opening; the first channel block includes a tie rod channel that aligns with the first tie rod opening of the first flange of the first ring portion, the second channel block includes a tie rod channel that aligns with the second tie rod opening of the first flange of the first ring portion, the third channel block includes a tie rod channel that aligns with the fifth tie rod opening of the first flange of the second ring portion, and the fourth channel block includes a tie rod channel that aligns with the sixth tie rod opening of the first flange of the second ring portion; the second flange of the first ring portion includes a seventh tie rod opening that aligns with the tie rod channel of the first channel block and the first tie rod opening of the first flange, the second flange of the first ring portion includes an eighth tie rod opening that aligns with the tie rod channel of second channel block and the second tie rod opening of the first flange, and wherein the second flange of the second ring portion includes a ninth tie rod opening that aligns with the tie rod channel of the third channel block and the fifth tie rod opening of the first flange, and the second flange of the second ring portion includes an tenth tie rod opening that aligns with the tie rod channel of the fourth channel block and the sixth tie rod opening of the first flange; the first, second, and third tie rod openings are located on one side of the restraint device, the fourth, fifth, and sixth tie rod openings are located on an opposite side of the restraint device from the one side of the restraint device with the first, second, and third tie rod openings, and no tie rod openings are located above and below the restraint device; each of the first and second ring portions includes an opening at the first location to receive the first fastener such that the first fastener is oriented in the openings transverse to the longitudinal extent of the pipe; and each of the first, second, third, fourth, fifth, and sixth tie rod openings are configured to receive a tie rod to connect the restraint device assembly to another pipe restraint.

Another illustrative embodiment of the present disclosure provides a restraint device assembly that couples adjoining pipes together. The restraint device assembly comprises a pair of ring portions composed of a first ring portion and a second ring portion; wherein the first and second ring portions each include an arcuate inner periphery; wherein positioned together the pair of ring portions encircle an outer wall surface of a pipe and engage a circumference of the outer wall surface of the pipe; a first fastener that engages both the first and second ring portions at a first location to selectively secure the first and second ring portions together at the first location; a second fastener that engages both the first and second ring portions at a second location to selectively secure the first and second ring portions together at the second location; wherein the first and second ring portions each includes a flange extending radially from each of the arcuate inner peripheries of each of the first and second ring portions; wherein the first ring portion includes a first tie rod opening located on the flange adjacent the first location; wherein the first ring portion includes a second tie rod opening located on the flange adjacent the second location and spaced apart from the first tie rod opening by a first distance; wherein no tie rod openings are located on the flange of the first ring portion between the first and second tie rod openings; wherein the second ring portion includes a third tie rod opening located on the flange of the second ring portion adjacent the first location; wherein the second ring portion includes a fourth tie rod opening located on the flange of the second ring portion adjacent the second location and spaced apart from the third tie rod opening a second distance; wherein no tie rod openings are located on the flange of the second ring portion between the third and fourth tie rod openings; wherein a third distance extends between the first and third tie rod openings which does not have the same length as the first distance between the first and second tie rod openings; and wherein a fourth distance extends between the second and fourth tie rod openings which does not have the same length as the second distance between the third and fourth tie rod openings.

In the above and other illustrative embodiments, the restraint device may further comprise: the arcuate inner periphery of the first ring portion does not have any substantial gaps that allow the pipe to deform and occupy, and wherein the arcuate inner periphery of the second ring portion does not have any substantial gaps that allow the pipe to deform and occupy; the first and second locations are positioned axially opposed to each other on an axis oriented transverse to a longitudinal extent of the pipe; a first portion of a fifth tie rod opening located on the first ring portion adjacent the first location and adjacent the second ring portion; wherein the first portion of the fifth tie rod opening is spaced apart from the first tie rod opening a third distance; wherein the third distance between the first portion of the fifth tie rod opening and the first tie rod opening does not have the same length as the first distance between the first and second tie rod openings; wherein a first portion of a sixth tie rod opening is located on the first ring portion adjacent the second location and adjacent the second ring portion; wherein the sixth tie rod opening is spaced apart from the second tie rod opening by a fourth distance; and wherein the fourth distance between the first portion of the sixth tie rod opening and the second tie rod opening does not have the same length as the first distance between the first and second tie rod openings; the second ring portion includes a second portion of the fifth tie rod opening located adjacent the first location and adjacent the first ring portion; the first ring portion includes a second portion of the sixth tie rod opening located adjacent the second location and adjacent the second ring portion; the first and second portions of the fifth tie rod opening form the fifth tie rod opening when the first fastener engages both the first and second ring portions at the first location and secures the first and second ring portions together; the first and second portions of the sixth tie rod opening Run the sixth tie rod opening when the second fastener engages both the first and second ring portions at the second location and secures the first and second ring portions together.

Another illustrative embodiment of the present disclosure provides a restraint device assembly that couples adjoining pipes together. The restraint device assembly comprises a pair of ring portions composed of a first ring portion and a second ring portion; wherein the first and second ring portions each include an arcuate inner periphery; wherein positioned together the pair of ring portions encircle an outer wall surface of a pipe; a first fastener that engages both the first and second ring portions at a first location to selectively secure the first and second ring portions together at the first location; a second fastener that engages both the first and second ring portions at a second location to selectively secure the first and second ring portions together at the second location; wherein the first ring portion includes a first tie rod opening located adjacent the first location; wherein the first ring portion includes a second tie rod opening located adjacent the second location and spaced apart from the first tie rod opening by a first distance; wherein the second ring portion includes a third tie rod opening located adjacent the first location; wherein the second ring portion includes a fourth tie rod opening located adjacent the second location and spaced apart from the third tie rod opening a second distance; wherein a third distance extends between the first and third tie rod openings; wherein the third distance between the first and third tie rod openings does not have the same length as the first distance between the first and second tie rod openings; wherein a fourth distance extends between the second and fourth tie rod openings; and wherein the fourth distance does not have the same length as the second distance between the third and fourth tie rod openings.

In the above and other illustrative embodiments, the restraint device may further comprise no tie rod openings being located on the first ring portion between the first and second tie rod openings, and no tie rod openings being located on the second ring portion between the third and fourth tie rod openings.

Another illustrative embodiment of the present disclosure provides a restraint device assembly that couples adjoining pipes together. The restraint device assembly comprises a ring portion that includes an arcuate inner periphery surface that encircles an outer wall surface of a pipe; wherein the ring includes a first tie rod opening located adjacent a first location and a second tie rod opening located adjacent a second location; wherein the first and second tie rod openings are spaced apart from the each other by a first distance; wherein the second ring portion includes a third tie rod opening located adjacent the first location; wherein the second ring portion includes a fourth tie rod opening located adjacent the second location and spaced apart from the third tie rod opening a second distance; wherein a third distance extends between the first and third tie rod openings; wherein the third distance between the first and third tie rod openings does not have the same length as the first distance between the first and second tie rod openings; wherein a fourth distance extends between the second and fourth tie rod openings; and wherein the fourth distance does not have the same length as the second distance between the third and fourth tie rod openings.

Additional features of the restraint device will become apparent to those skilled in the art upon considering the following description exemplifying this disclosure as presently perceived.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the restraint device assembly, and such exemplification is not to be construed as limiting the scope of the restraint device assembly in any manner.

DETAILED DESCRIPTION OF THE DRAWINGS

The present disclosure will be described hereafter with reference to the attached drawings which are given as non-limiting examples. The drawings and descriptions provided herein may have been simplified to illustrate aspects that are relevant for a clear understanding of the herein described structures, while eliminating, for the purpose of clarity, other aspects that may be found in typical structures. Those of ordinary skill may recognize that other elements and/or operations may be desirable and/or necessary to implement the structures described herein. Because such elements and operations would be known in the art, and because they do not facilitate a better understanding of the present disclosure, a discussion of such elements and operations may not be provided herein. The present disclosure, however, is deemed to inherently include all such elements, variations, and modifications to the described aspects that would be known to those of ordinary skill in the art.

An illustrative embodiment of the present disclosure provides a restraint device assembly configured to clamp onto PVCO pipes. The restraint device of the present disclosure is configured to minimize reliance on the pipe wall for support. In the illustrative embodiment, the restraint device assembly may have a wider-contact area then typical joint restraints to change the way the force is distributed. For example, the restraint device of the present disclosure may be two times the width of a standard restraint device. This allows more of the stiffness of the pipe wall to be used to support the restraint. The width changes the force distribution on the pipe by changing the location of the pipe force that results from connection to another restraint or anchor.

The restraint device assembly of the present disclosure also has a clamping bolt located in close proximity to the connecting tie rods which may eliminate a pivot point and prevent excessive loading on the pipe. In addition, the clamping fasteners and anchor locations are not positioned below the pipe which assist in making the installation easier. It is appreciated that these clamps may be used as a stand-alone restraint in conjunction with a mechanical joint (MJ) gland to a MJ fitting, or used in conjunction with other like restraint devices such as a bell and spigot harness assembly.

Pressurized piping systems have unbalanced pressure forces at any change in cross-sectional area or change in direction. These forces may be balanced by the use of mechanical restraint devices. These devices however, are utilized at the connection associated with the change in cross sectional area or direction, and all connections within a determined distance. Thus mechanical restrain devices are required to fit different types of pipe connections. The primary connections that must be retained are bell-and-spigot connections and fittings such as bends, tees, and wyes. A bell-and-spigot connection is the result of plastic pipe formation that allows the straight end of pipe to be inserted in an enlarged end section of pipe.

A gasket creates the seal between the two pipes. A bell-and-spigot connection is a straight connection. A fitting has a similar connection mechanism but is intended for changes in flow direction or cross sectional area. A bell-and-spigot connection may be restrained with two rings attached to the pipe on either side of the bell-and-spigot. These rings may be connected by tie-rods. The nature of a fitting is that it does not have the same diameter and characteristics of a bell-and-spigot connection and thus require a special ring that can be fitted on the periphery and will use a gasket location protrusion to prevent joint separation. The restraint device of the present disclosure may be joined to that special ring to prevent joint separation. It is appreciated that the restraint device of the present disclosure may be used with most types of plastic pipes. The restraint device may also be used with a backup ring for use on a bell or C907 PVC fittings.

Furthering the illustrative embodiment, the restraint device assembly is composed of two halves that fit about the outer diameter of a pipe. The illustrative restraint device includes six tie rod bores that are not evenly spaced apart about the perimeter of the restraint device. Instead, three tie rod bores are positioned on one side of the restraint and the other three tie rod bores are positioned on the other side of the restraint. Unlike conventional joint restraints, there are no tie rod bores or the like on either the top or the bottom of the restraint device. On each side of the restraint device one of the tie rod bores is formed at the edge of each clamp ring portion. When both clamp ring portions are assembled together each contributes a portion of the tie rod bore. Also, on each side of the restraint device are two additional tie rod bores, one above the aforementioned central tie rod bore and one below. In other words, each side of each ring portion of the restraint device includes one tie rod hole and one portion of a tie rod hole. As such, when the restraint device is formed by the two portions, there are three tie rod holes on each side. It is appreciated that with this configuration either two or four tie rods may be used. For example, on each side of the restraint device, the upper and lower tie rod hole may receive a tie rod to connect to a corresponding restraint device. Alternatively, the central tie rod hole may be used exclusive of the upper and lower tie rod bores, depending on the needed connection arrangement. This flexibility allows an installer to select a desired arrangement of the tie rods—either one on each side or two on each side, for example. Additionally, by spacing the tie rod bores on only the sides of the restraint device rather than evenly spaced around its entire circumference, none of the tie rods are located on the underside of the pipe. This makes installation easier. These tie rod hole arrangements are particularly useful on Tyton type push-on fittings. It is further appreciated that each ring portion will provide almost complete contact with the outer surface of the pipe wall. This means that the inner surface of the restraint device will be in almost complete contact with the pipe wall allowing the tie rods to be non equally spaced about the circumference of the pipe yet still hold it with sufficiently force.

Figure 1:
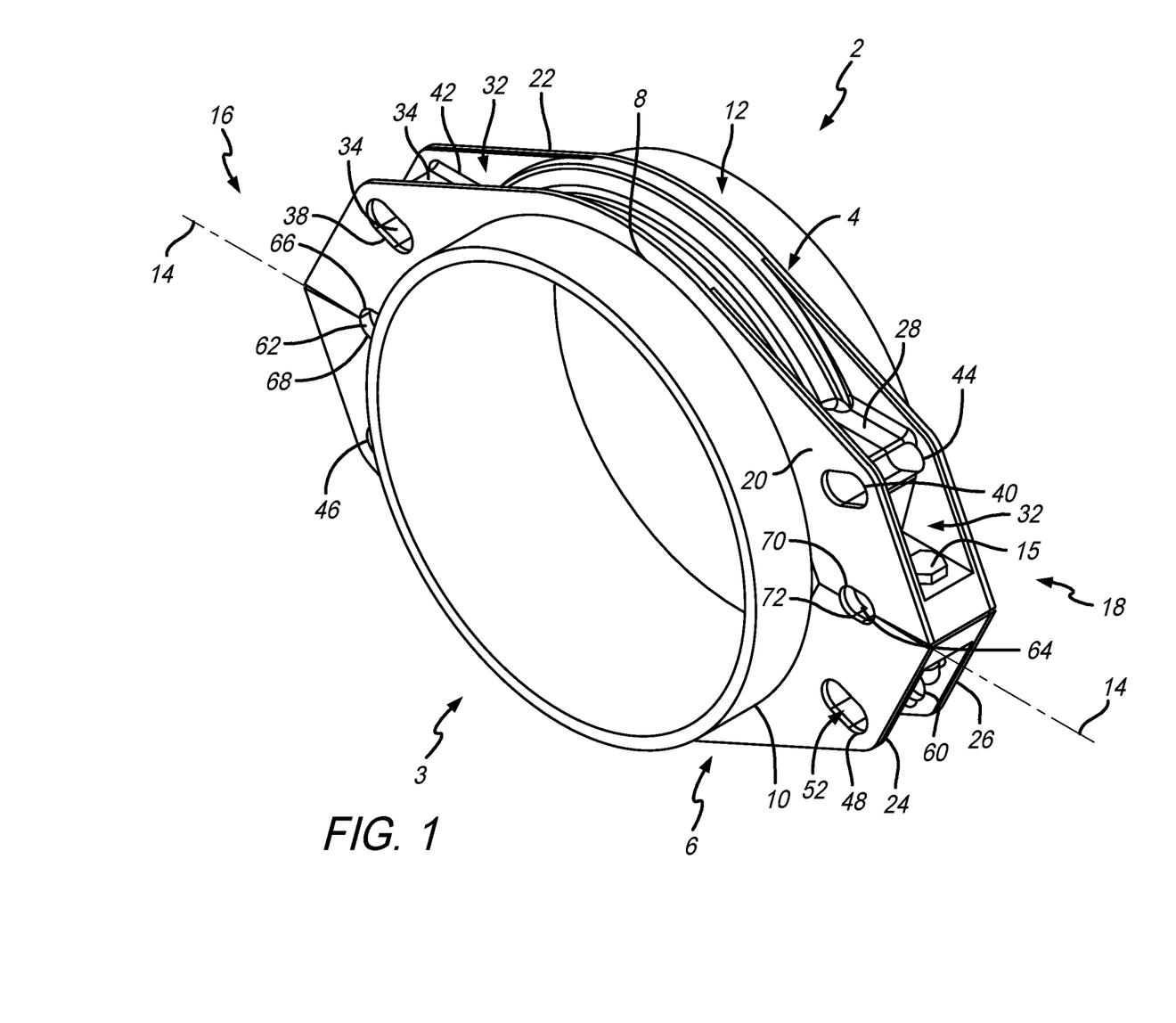
FIG. 1 is a perspective view of an illustrative embodiment of a restraint device assembly.

A perspective view of an illustrative embodiment of restraint device 2 is shown in FIG. 1. Restraint device assembly 2 is shown assembled onto pipe 3. Illustratively, pipe 3 may be a PVCO-type pipe. Restraint device assembly 2 is composed of two ring portions 4 and 6, each of which have a semi-circular interior rim 8 and 10, respectively, that engages outer surface 12 of pipe 3. As shown in the illustrative embodiment, each ring portion 4 and 6 join together at axis line 14 and secure via bolt 15 engaging both ring portions 4 and 6 on each side 16 and 18 of restraint device assembly 2. The result is the semi-circular interior rims 8 and 10 of ring portions 4 and 6, respectively, engage almost the entire circumference of pipe 3 where restraint device assembly 2 is located, as shown in FIG. 1.

In this illustrative embodiment, ring portion 4 includes extending flanges 20 and 22. Likewise, ring portion 6 includes similar extending flange portions 24 and 26 (see also, for example, FIGS. 3 and 5). Each of the pairs of extending flanges as shown are illustratively spaced apart. Channel blocks 28 and 30 are located between extending flanges 20 and 22 in space 32. Each channel block 28 and 30 has a tie rod channel 34 and 36 respectively, disposed thereon aligning with openings 38 and 40, respectively, in extending flanges 20, and openings 42 (see, also, FIG. 6) and 44 in extending flange 22. Similarly, openings 46 (see also FIGS. 4) and 48 are disposed through extending flange 24 which open to tie rod channels 50 and 52 of channel block 54 and 56 (see FIG. 6), respectively, and extending through openings 58 (see FIGS. 6) and 60 of extending flange 26.

Additional tie rod holes 62 and 64 are shown disposed through restraint device assembly 2 at line 14. Illustratively, each tie rod hole 62 and 64 are composed of tie rod channels 66 and 68, and 70 and 72, respectively formed in ring portions 4 and 6, as shown. As will be appreciated by the skilled artisan upon reading this disclosure, tie rods may be extended through either openings 38, 46, 62 on side 16 as well as openings 40, 48, 64 on side 18 (see, also, FIGS. 2 and 3). Unlike prior restraint glands, the three tie rod openings are only located on the sides of restraint device assembly 2 rather than being equidistant, this makes assembling the joint restraints easier. Now tie rods need only be attached at the sides rather than the top and bottom as well.

Figure 2:
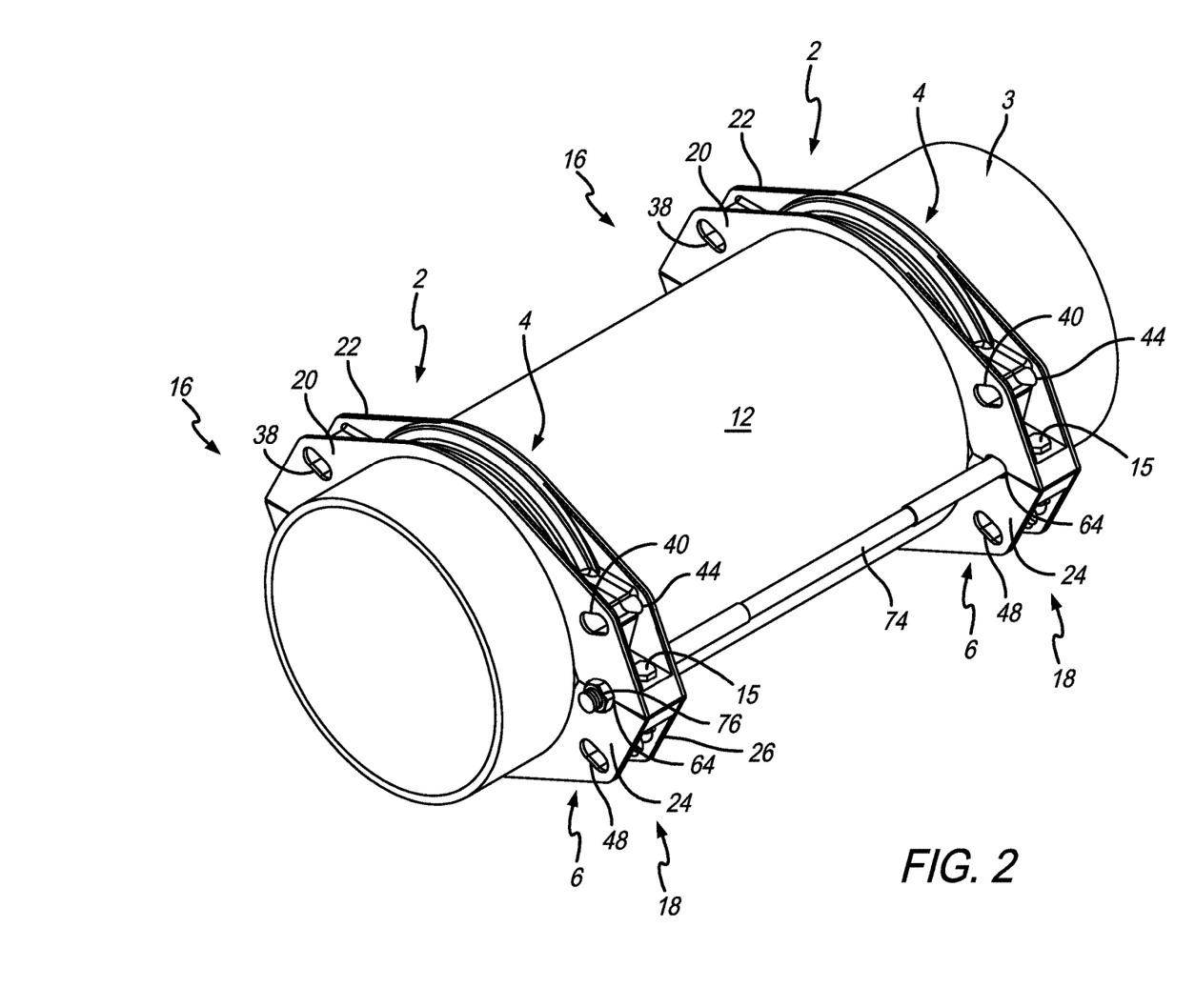
FIG. 2 is a perspective view of a PVCO type pipe with the restraint device assembly attached thereto.

A perspective view of pipe 3, which is illustratively a PVCO pipe, with restraint device assembly 2 attached thereto, is shown in FIG. 2. Here, a tie rod 74 is disposed through each opening 64 of each of restraint device assembly 2 on side 18. Illustratively, tie rod 74 is secured to each restraint device assembly 2 via nut 76 as shown. It is appreciated from this view how tie rod 74 may be attached to restraint device assemblies 2 on side 18 (as well as side 16 not shown in this view). This is opposed to having tie rods evenly spaced about the circumference of pipe 3 such as is the practice with conventional joint restraints. It is evident from this view how assembling restraint device assemblies 2 onto pipe 3 may therefore be easier than the conventional joint restraints. This is particularly the case since there are no tie rod holes on the bottom of restraint device assemblies 2 requiring assembly operations underneath pipe 3.

Figure 3:
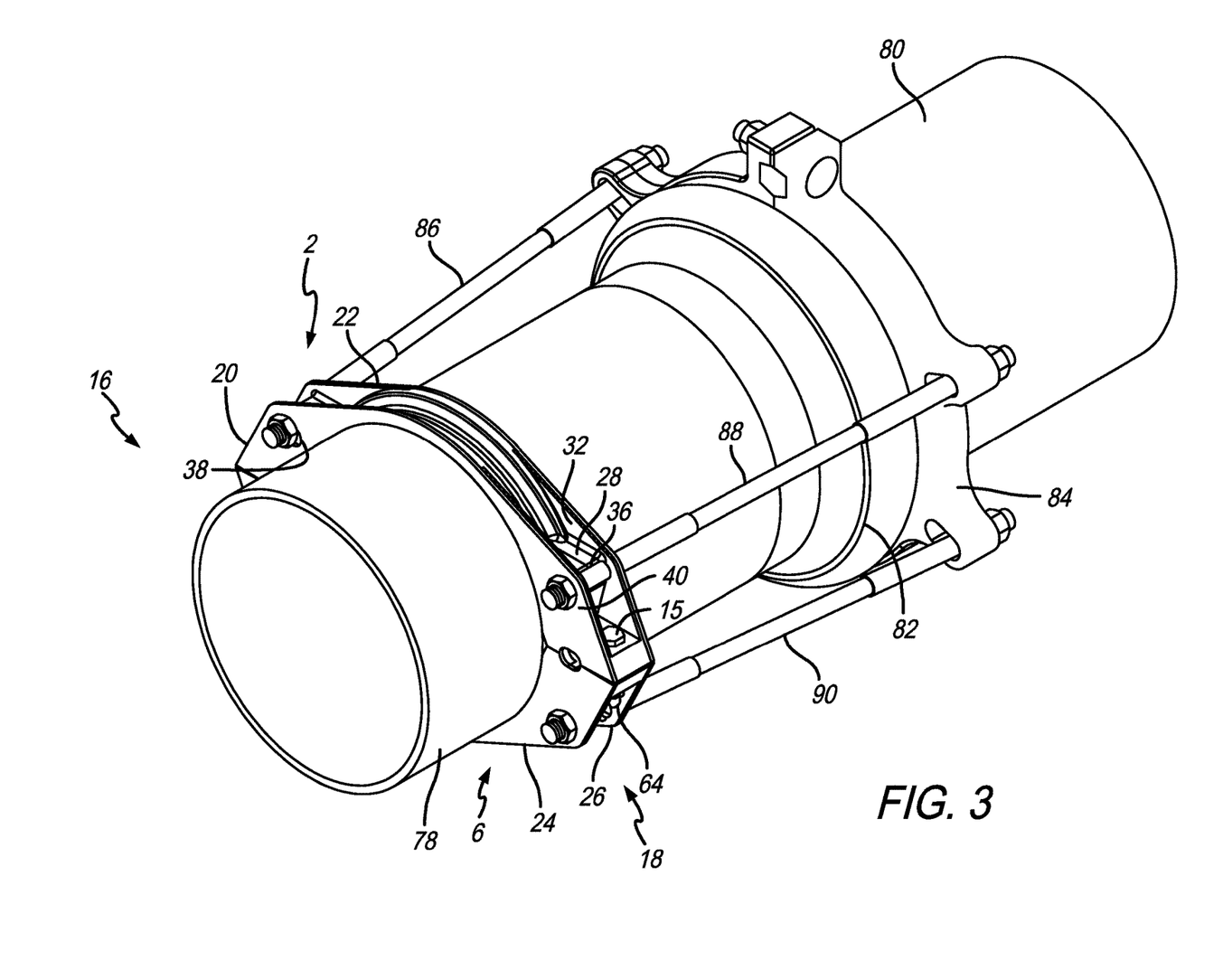
FIG. 3 is a perspective view of a plurality of pipes coupled together via a conventional bell and spigot arrangement and further secured by the restraint device assembly.

A perspective view of coupled pipes 78 and 80 engaged via the conventional bell and spigot arrangement at 82 is shown in FIG. 3. Pipes 78 and 80 are further secured by restraint device assembly 2 coupled to pipe 78 and tied to restraint 84 coupled to pipe 80, via tie rods 86, 88, and 90. A fourth tie rod (not shown) may also secure to both restraint device assembly 2 and restraint 84 on side 16 of restraint device assembly 2. It can be appreciated from this view how restraint device assembly 2 has the inherent flexibility of tying joints together as shown in FIG. 3 with four tie rods, or attached to pipes or other joints, using two tie rods, attached along center line 14 at tie rod holes 62 and 64, as shown in FIG. 2. As can be further appreciated by the view of FIG. 3, the arrangement of the openings such as openings 40 and 48 in restraint device assembly 2 positions tie rods 88 and 90 in the correct location to also be received in a conventional joint restraint such as restraint 84 shown. Also shown herein is tie rod 88 located in tie rod channel 36 of channel block 28 in space 32 between extending flanges 20 and 22. It will be further appreciated that this arrangement between channel blocks and tie rods for both ring portions 4 and 6 operates substantially the same way. It is still further appreciated in this view how despite employing four tie rods, they are located only on either side 16 or 18 of restraint device assembly 2 rather than evenly spaced about its circumference. Again, this allows installation to move relatively quickly and be easier than conventional restraints since the tie rods do not need to be attached underneath pipe 78 when installed in the ground. In this embodiment, tie rod holes 62 and 64 formed between ring portions 4 and 6 (see, also, FIG. 1) may not need to be used in this arrangement.

Figure 4:
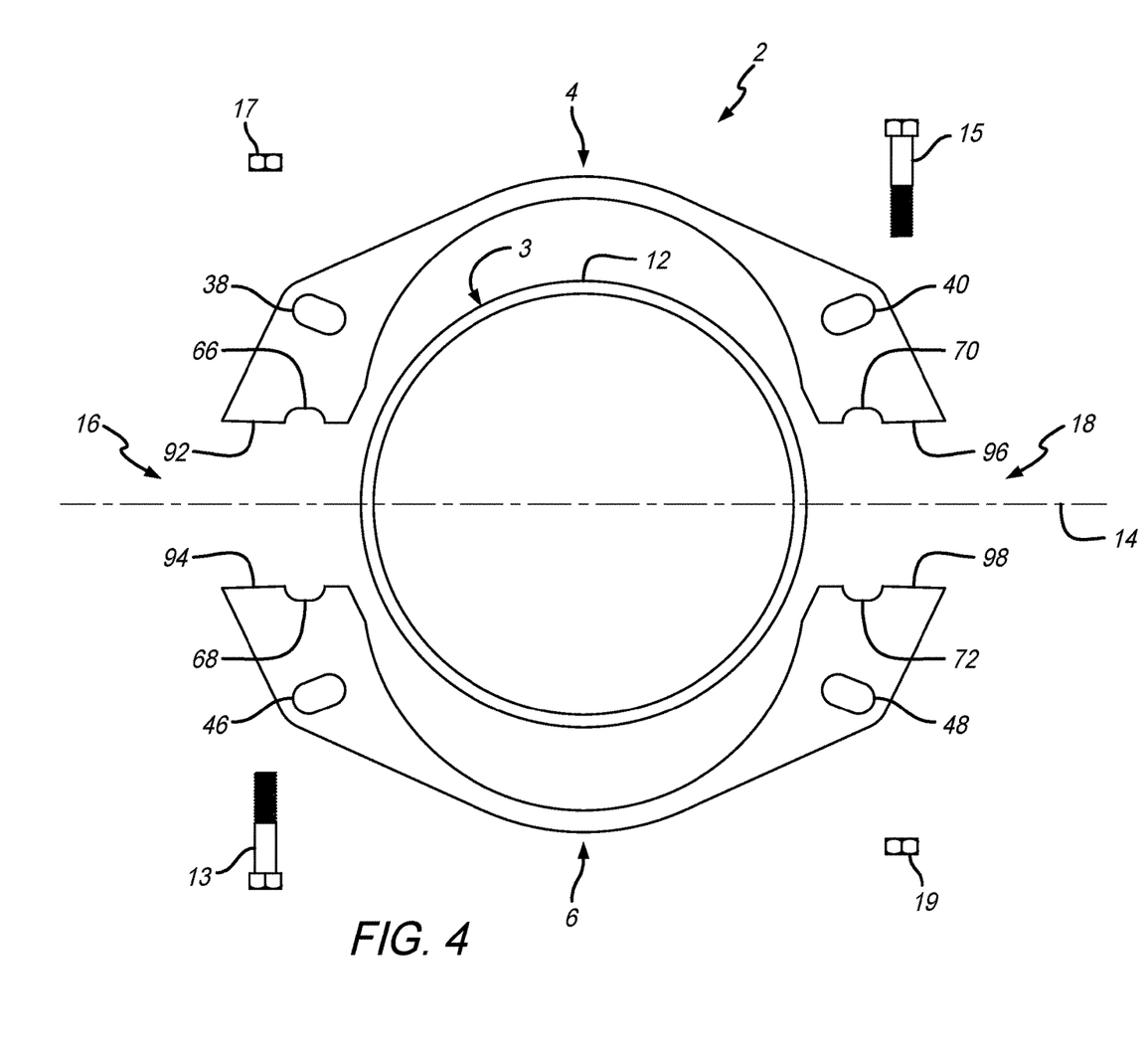
FIG. 4 is a front exploded view of the restraint device assembly surrounding the pipe.

A front exploded view of restraint device assembly 2 surrounding pipe 3 is shown in FIG. 4. This view further depicts the structures that make up restraint device assembly 2 including ring portions 4 and 6, as well as bolts 13 and 15 with corresponding nuts 17 and 19. It is appreciated that ring portions 4 and 6 may be brought together and secured to form restraint device assembly 2 when bolts 13 and 15 are disposed through both and secured thereto by attaching nuts 17 and 19 via conventional means. This view also depicts how tie rod holes 62 and 64 are formed via tie rod channels 66, 68, 70, and 72, respectively formed on ends 92, 94, 96, and 98 (forming axis line 14) that abut together to form the full restraint device assembly 2 that surrounds outer surface 12 of pipe 3. Also shown in this view are tie rod openings 38, 40, 46, and 48 positioned respectively on each side 16 and 18 of restraint device assembly 2 as shown. The tie rod holes are spaced apart from each other and only located on each side 16 and 18 to distribute the securement force for a corresponding restraint that can be attached while not requiring any tie rods to be located either below or above restraint device assembly 2.

Figure 5:
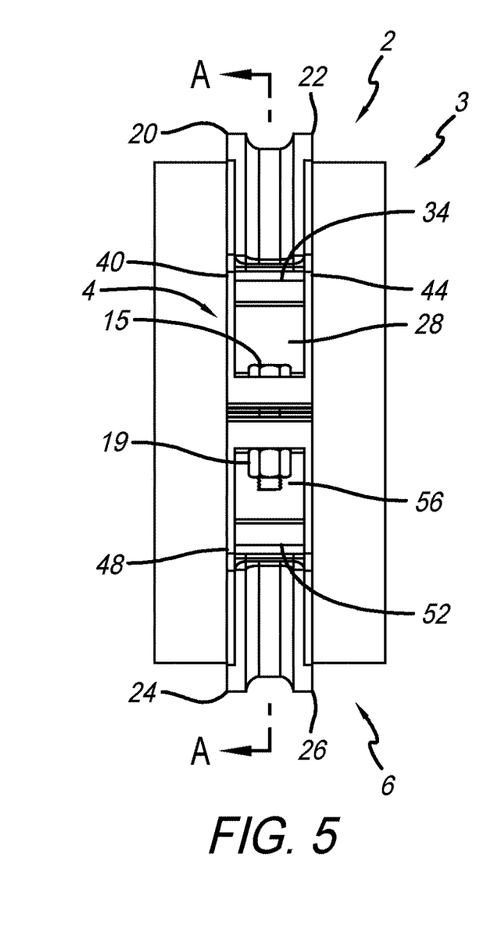
FIG. 5 is a side view of the restraint device assembly coupled to a portion of the pipe.

A side view of restraint device assembly 2 coupled to a portion of pipe 3 is shown in FIG. 5. This view depicts space 32 located between extended flanges 20 and 22 along with channel blocks 28 and 56. Also shown is bolt 15 disposed through both ring portion 4 and 6 and secured via nut 19 to form the assembled restraint device assembly 2. Channel blocks 28 and 56 further show tie rod channels 34 and 52 that align with tie rod openings 40 and 44 on flanges 20 and 22, respectively, and tie rod openings 48 and 60 on extending flanges 24 and 26, respectively, with respect to block 56.

Figure 6:
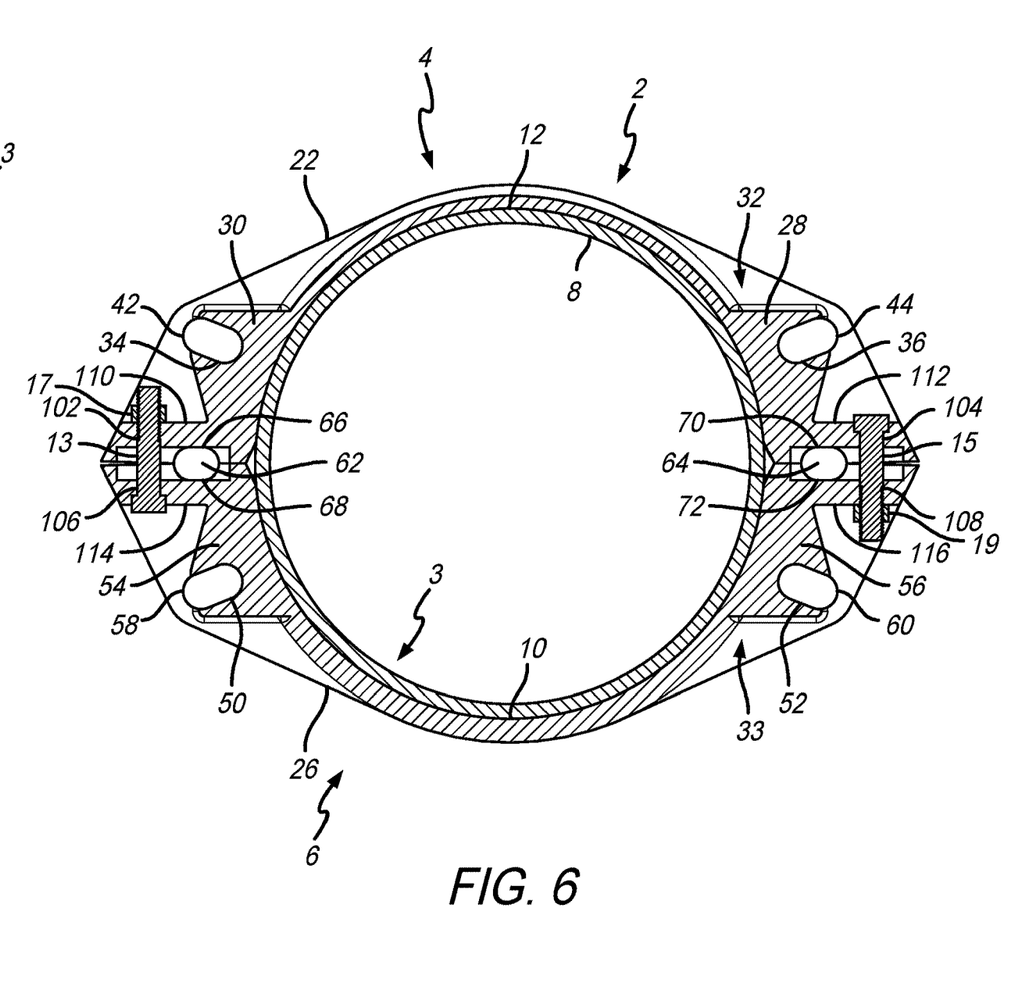
FIG. 6 is a cross-sectional view of the restraint device assembly on the pipe taken along lines A-A of FIG. 5.

A cross-sectional front view taken along lines A-A of restraint device assembly 2, on pipe 3 from FIG. 5, is shown in FIG. 6. This view assists depicting the structures in space 32 between extending flanges 20 and 22, as well as space 33 between extending flanges 24 and 26. This view also helps demonstrate how ring portions 4 and 6 join together to form the full restraint device assembly 2. With respect to ring portion 4, shown are channel blocks 30 and 28 along with their corresponding tie rod channels 34 and 36 aligned with openings 42 and 44 in extending flange 22. Similarly, channel blocks 54 and 56 include tie rod channels 50 and 52 that correspond to openings 58 and 60, as shown, disposed through extending flange 26 of ring portion 6. Also shown in this view are bolt holes 102, 104, 106, and 108 disposed through body sections 110, 112, 114, and 116 of ring portions 4 and 6. It is appreciated from this view how extending bolts 13 and 15 through bolt holes 102, 104, 106, and 108, as depicted, and securing nuts 17 and 19, respectively, as also shown, attach ring portions 4 and 6 to each other to form the full restraint device assembly 2. Tie rod holes 62 and 64, are shown formed by tie rod channels 66, 68, 70, 72, respectively, and are configured to receive illustrative tie rods, as previously discussed. Lastly, this view further illustrates how a semi-circular interior rims 8 and 10 of ring portions 4 and 6, respectively, contact almost the entire circumference of outer surface 12 of Pipe 3. It may therefore, also be appreciated from this view how restraint device assembly 2 forms about and secures onto outer surface 12 of pipe 3.

Figure 7:
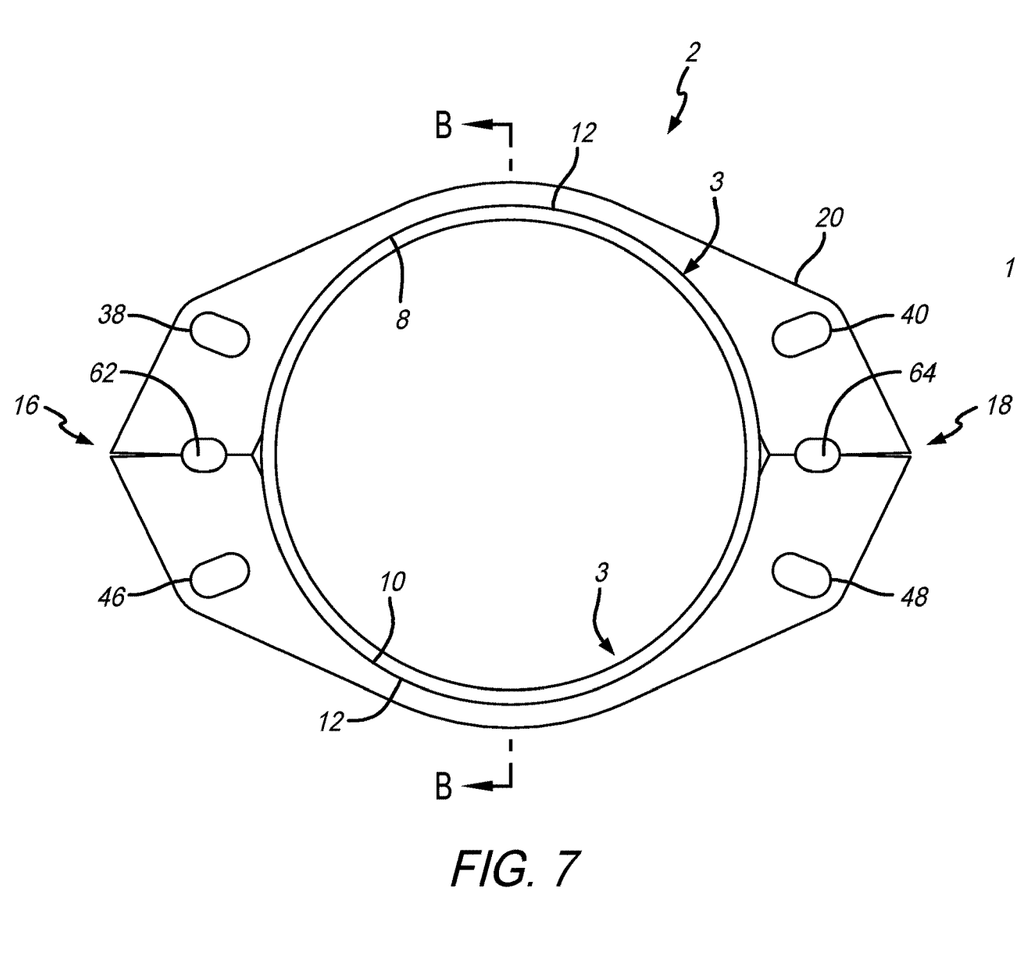
FIG. 7 is a front view of the restraint device assembly secured onto the pipe.

A front view of restraint device assembly 2 secured onto Pipe 3 is shown in FIG. 7. This view further depicts the relative positioning of tie rod openings 38, 40, 46, and 48 configured to receive tie rods on sides 16 and 18 of restraint device assembly 2. Also shown are openings 62 and 64 that receive tie rods in addition to or alternatively to the tie rods that secure to restraint device assembly 2. This view also shows how semi-circular interior rims 8 and 10 engage almost the entire circumference of outer surface 12 of pipe 3 at the attachment location of restraint device assembly 2.

Figure 8:
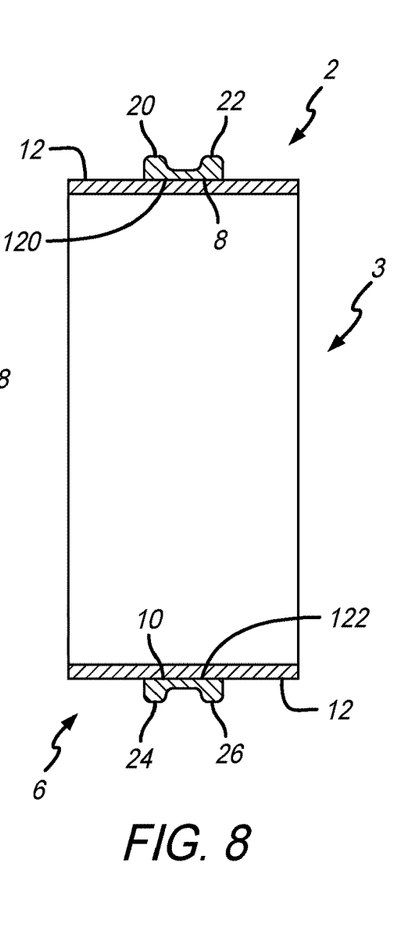
FIG. 8 is a cross-sectional view of the restraint device assembly on the pipe taken along lines B-B of FIG. 7.

A cross-sectional view taken along the lines B-B of restraint device assembly 2 and pipe 3 of FIG. 7, is shown in FIG. 8. This view further depicts how semi-circular interior rims 8 and 10 engage outer surface 12 of Pipe 3. In illustrative embodiments, serrations 120 and 122 may be formed on the surface of rims 8 and 10 to provide a grip surface on surface 12 of pipe 3. Also shown are extending flanges 20, 22 of ring portion 4 and extending portions 24 and 26 of ring portion 6.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure.

What is claimed:

1. A restraint device assembly that couples adjoining pipes together, the restraint device assembly comprising:
   a pair of ring portions composed of a first ring portion and a second ring portion;
   wherein the first and second ring portions each include an arcuate inner periphery;

wherein positioned together the pair of ring portions encircle an outer wall surface of a pipe and engage a circumference of the outer wall surface of the pipe;

wherein the arcuate inner periphery of the first ring portion does not have any substantial gaps that allow the pipe to deform and occupy;

wherein the arcuate inner periphery of the second ring portion does not have any substantial gaps that allow the pipe to deform and occupy;

a first fastener that engages both the first and second ring portions at a first location to selectively secure the first and second ring portions together at the first location;

a second fastener that engages both the first and second ring portions at a second location to selectively secure the first and second ring portions together at the second location;

wherein the first and second locations are positioned axially opposed to each other on an axis oriented transverse to a longitudinal extent of the pipe;

wherein the first and second ring portions each includes a flange extending radially from each of the arcuate inner peripheries of each of the first and second ring portions;

wherein the first ring portion includes a first tie rod opening located on the flange adjacent the first location;

wherein the first ring portion includes a second tie rod opening located on the flange adjacent the second location and spaced apart from the first tie rod opening by a first distance;

wherein no tie rod openings are located on the flange of the first ring portion between the first and second tie rod openings;

wherein a first portion of a third tie rod opening is located on the first ring portion adjacent the first location and adjacent the second ring portion;

wherein the first portion of the third tie rod opening is spaced apart from the first tie rod opening a second distance;

wherein the second distance between the first portion of the third tie rod opening and the first tie rod opening does not have the same length as the first distance between the first and second tie rod openings;

wherein a first portion of a fourth tie rod opening is located on the first ring portion adjacent the second location and adjacent the second ring portion;

wherein the third distance between the first portion of the fourth tie rod opening and the second tie rod opening does not have the same length as the first distance between the first and second tie rod openings;

wherein the second ring portion includes a fifth tie rod opening located on the flange of the second ring portion adjacent the first location;

wherein the second ring portion includes a sixth tie rod opening located on the flange of the second ring portion adjacent the second location and spaced apart from the fifth tie rod opening a fourth distance;

wherein no tie rod openings are located on the flange of the second ring portion between the fifth and sixth tie rod openings;

wherein a second portion of a third tie rod opening is located on the second ring portion adjacent the first location and adjacent the first ring portion;

wherein a fifth distance between the second portion of the third tie rod opening and the fifth tie rod opening does not have the same length as the fourth distance between the fifth and sixth tie rod openings;

wherein a second portion of a fourth tie rod opening is located on the second ring portion adjacent the second location and adjacent the first ring portion;

wherein a sixth distance between the second portion of the fourth tie rod opening and the sixth tie rod opening does not have the same length as the fourth distance between the fifth and sixth tie rod openings;

wherein the first and second portions of the third tie rod opening form the third tie rod opening when the first fastener engages both the first and second ring portions at the first location and secures the first and second ring portions together; and wherein the first and second portions of the fourth tie rod opening form the fourth tie rod opening when the second fastener engages both the first and second ring portions at the second location and secures the first and second ring portions together.

2. The restraint device assembly of claim 1, wherein the first fastener engages both the first and second ring portions at the first location and adjacent the first, third, and fifth tie rod openings to prevent a pivot point at the first location to prevent excessive loading on the pipe, and wherein the second fastener engages both the first and second ring portions at the second location and adjacent the second, fourth, and sixth tie rod openings to prevent a pivot point at the second location to prevent excessive loading on the pipe.

3. The restraint device assembly of claim 1, wherein the first ring portion includes a second flange extending radially from the arcuate inner periphery of the first ring portion, spaced apart from and parallel to the flange extending radially from the arcuate inner periphery of the first ring portion, and wherein the second ring portion includes a second flange extending radially from the arcuate inner periphery of the second ring portion, spaced apart from and parallel to the flange extending radially from the arcuate inner periphery of the ring portion.

4. The restraint device assembly of claim 3, wherein the first ring portion includes a first channel block located between the flange and the second flange at the first tie rod opening, and a second channel block located between the flange and the second flange at the second tie rod opening, and wherein the second ring portion includes a third channel block located between the flange and the second flange at the fifth tie rod opening, and a fourth channel block located between the flange and the second flange at the sixth tie rod opening.

5. The restraint device assembly of claim 4, wherein the first channel block includes a tie rod channel that aligns with the first tie rod opening of the first flange of the first ring portion, the second channel block includes a tie rod channel that aligns with the second tie rod opening of the first flange of the first ring portion, the third channel block includes a tie rod channel that aligns with the fifth tie rod opening of the first flange of the second ring portion, and the fourth channel block includes a tie rod channel that aligns with the sixth tie rod opening of the first flange of the second ring portion.

6. The restraint device assembly of claim 5, wherein the second flange of the first ring portion includes a seventh tie rod opening that aligns with the tie rod channel of the first channel block and the first tie rod opening of the first flange, the second flange of the first ring portion includes an eighth tie rod opening that aligns with the tie rod channel of second channel block and the second tie rod opening of the first flange, and wherein the second flange of the second ring portion includes a ninth tie rod opening that aligns with the tie rod channel of the third channel block and the fifth tie rod opening of the first flange, and the second flange of the second ring portion includes an tenth tie rod opening that aligns with the tie rod channel of the fourth channel block and the sixth tie rod opening of the first flange.

7. The restraint device assembly of claim 1, wherein the first, second, and third tie rod openings are located on one side of the restraint device, the fourth, fifth, and sixth tie rod openings are located an opposite side of the restraint device from the one side of the restraint device with the first, second, and third tie rod openings, and no tie rod openings are located above and below the restraint device.

8. The restraint device assembly of claim 1, wherein each of the first and second ring portions includes an opening at the first location to receive the first fastener such that the first fastener is oriented in the openings transverse to the longitudinal extent of the pipe.

9. The restraint device assembly of claim 1, wherein each of the first, second, third, fourth, fifth, and sixth tie rod openings are configured to receive a tie rod to connect the restraint device assembly to another pipe restraint.

10. A restraint device assembly that couples adjoining pipes together, the restraint device assembly comprising:
a pair of ring portions composed of a first ring portion and a second ring portion;
wherein the first and second ring portions each include an arcuate inner periphery;
wherein positioned together the pair of ring portions encircle an outer wall surface of a pipe and engage a circumference of the outer wall surface of the pipe;
a first fastener that engages both the first and second ring portions at a first location to selectively secure the first and second ring portions together at the first location;
a second fastener that engages both the first and second ring portions at a second location to selectively secure the first and second ring portions together at the second location;
wherein the first and second ring portions each includes a flange extending radially from each of the arcuate inner peripheries of each of the first and second ring portions;
wherein the first ring portion includes a first tie rod opening located on the flange adjacent the first location;
wherein the first ring portion includes a second tie rod opening located on the flange adjacent the second location and spaced apart from the first tie rod opening by a first distance;
wherein no tie rod openings are located on the flange of the first ring portion between the first and second tie rod openings;
wherein the second ring portion includes a third tie rod opening located on the flange of the second ring portion adjacent the first location;
wherein the second ring portion includes a fourth tie rod opening located on the flange of the second ring portion adjacent the second location and spaced apart from the third tie rod opening a second distance;
wherein no tie rod openings are located on the flange of the second ring portion between the third and fourth tie rod openings;
wherein a third distance extends between the first and third tie rod openings which does not have the same length as the first distance between the first and second tie rod openings; and
wherein a fourth distance extends between the second and fourth tie rod openings which does not have the same length as the second distance between the third and fourth tie rod openings.

11. The restraint device assembly of claim 10, wherein the arcuate inner periphery of the first ring portion does not have any substantial gaps that allow the pipe to deform and occupy, and wherein the arcuate inner periphery of the second ring portion does not have any substantial gaps that allow the pipe to deform and occupy.

12. The restraint device assembly of claim 10, wherein the first and second locations are positioned axially opposed to each other on an axis oriented transverse to a longitudinal extent of the pipe.

13. The restraint device assembly of claim 10, further comprising a first portion of a fifth tie rod opening located on the first ring portion adjacent the first location and adjacent the second ring portion; wherein the first portion of the fifth tie rod opening is spaced apart from the first tie rod opening a third distance; wherein the third distance between the first portion of the fifth tie rod opening and the first tie rod opening does not have the same length as the first distance between the first and second tie rod openings; wherein a first portion of a sixth tie rod opening is located on the first ring portion adjacent the second location and adjacent the second ring portion; wherein the sixth tie rod opening is spaced apart from the second tie rod opening by a fourth distance; and wherein the fourth distance between the first portion of the sixth tie rod opening and the second tie rod opening does not have the same length as the first distance between the first and second tie rod openings.

14. The restraint device assembly of claim 13, wherein the second ring portion includes a second portion of the fifth tie rod opening located adjacent the first location and adjacent the first ring portion.

15. The restraint device assembly of claim 14, wherein the first ring portion includes a second portion of the sixth tie rod opening located adjacent the second location and adjacent the second ring portion.

16. The restraint device assembly of claim 15, wherein the first and second portions of the fifth tie rod opening form the fifth tie rod opening when the first fastener engages both the first and second ring portions at the first location and secures the first and second ring portions together.

17. The restraint device assembly of claim 15, wherein the first and second portions of the sixth tie rod opening form the sixth tie rod opening when the second fastener engages both the first and second ring portions at the second location and secures the first and second ring portions together.

* * * * *